United States Patent
Dannels

[19]

[11] Patent Number: 6,146,727

[45] Date of Patent: Nov. 14, 2000

[54] COMPOSITE PHENOLIC BRAKE PISTON WITH IMPROVED HEAT RESISTANCE

[76] Inventor: W. Andrew Dannels, 4812 E. River Rd., Grand Island, N.Y. 14072

[21] Appl. No.: 09/227,901

[22] Filed: Jan. 8, 1999

Related U.S. Application Data

[63] Continuation-in-part of application No. 08/801,572, Feb. 18, 1997, abandoned.

[51] Int. Cl.[7] .................................................... F16D 65/78

[52] U.S. Cl. ..................................... 428/36.4; 188/264 G; 92/248; 428/35.7

[58] Field of Search ................................. 428/36.4, 35.7; 92/248; 188/264 G

[56] References Cited

U.S. PATENT DOCUMENTS 5,607,769 3/1997 Choate .

FOREIGN PATENT DOCUMENTS

H3-236943 10/1998 Japan .

*Primary Examiner*—Daniel Zirker
*Attorney, Agent, or Firm*—Simpson, Simpson & Snyder, L.L.P.

[57] ABSTRACT

A composite molded plastic brake piston which comprises a phenolic resin body that is co-molded to a skin which comprises a phenolic sheet molding compound. The skin adheres to at least one surface of the article. The phenolic resins of the two compounds are cross-linked into a molded product which resists separation by mechanical, chemical or thermal methods.

16 Claims, 6 Drawing Sheets

COMPOSITE PHENOLIC BRAKE PISTON WITH IMPROVED HEAT RESISTANCE

CROSS-REFERENCE TO RELATED APPLICATION

This is a continuation-in-part of U.S. patent application Ser. No. 08/801,572, filed Feb. 18, 1997, now abandonded.

BACKGROUND OF THE INVENTION

This invention relates generally to composite plastic molded articles with improved heat resistance and, specifically, to a composite phenolic brake piston with improved heat resistance. The brake piston of the invention is intended for use in the automotive and truck industry.

The invention is also applicable to composite molded articles that are useful in other applications that are exposed to high temperatures in the automotive, appliance, electrical, electronic and aerospace industries.

Automotive and truck disc brake pistons are currently manufactured from:

1. Steel (plated with nickel or chrome)
2. Phenolic resin molding compounds
3. Phenolic resin molding compounds provided with a metal cap.

Each material demonstrates a different performance in braking systems.

Steel pistons have high thermal conductivity that can result in high brake fluid temperature which is a safety concern. Phenolic pistons are thermal insulators that result in lower brake fluid temperatures. Phenolic pistons with metal caps provide better thermal insulation and lower fluid temperatures than metal pistons, but are not as good an insulator as all plastic pistons.

Phenolic disc brake pistons have heat resistance limits resulting in surface cracks or blisters from thermal shock on short term exposure to high temperatures. The phenolic piston can degrade from long term or repeated exposure to high temperatures. This is the result of oxidation of the phenolic material.

Phenolic pistons with a molded on metal cap as a heat shield have improved crack resistance compared to phenolic pistons without a metal cap. The long term heat resistance or oxidation resistance is also improved.

Weak points of the phenolic piston with the metal cap are:

1. The molded cap loosens on long term exposure to high temperatures due to the differential thermal expansion of the steel as compared to phenolic materials. Further, phenolic materials undergo post mold shrinkage.
2. There is also a heat concentration at the interface of the metal cap with the outside surface of the phenolic piston.

Both items 1 and 2 can contribute to cracks, oxidation, and loss of strength.

U.S. Pat. No. 4,449,447 (Yanagi) discloses bonded-on heat resistant rings which can separate from the phenolic piston body on exposure to heat. Separation appears to be due to differential thermal expansion of the two materials. Other factors relating to separation appear to be post shrinkage of the phenolic material, and heat in combination with mechanical load.

Japanese Patent Application No. H3-236943 (1991) (Hokoi) discloses a compound molded product consisting of a pre-preg and a molding material of SMC, BMC or a pre-mix consisting of the same type of resin and fiber (substrate) in each material. The resultant molded article demonstrates improved, selective strength and good appearance. Unfortunately, the article does not appear suitable for use in a phenolic brake piston because there is no teaching in the Hokoi patent application of improved heat resistance at an acceptable price range for automotive brake usage.

Accordingly there is a need for a heat resistant phenolic plastic piston that resists separation when subjected to thermal, chemical or mechanical stress.

Transmission thrust washers, also known as thrust spacers, are currently manufactured from:

1. Low friction metal such as bronze.
2. Phenolic molding compounds

Thrust bearings are manufactured from needle bearings and assembly, and perform the same function as thrust washers.

The phenolic molding compound gives the lowest cost washer, but can degrade under heat and pressure and/or damage the friction plate it rides against.

The needle bearings are lower friction systems with higher costs.

Thrust washers have been combined with reactors or stators in the torque converters of automatic transmissions. The resulting articles have what is known as a castled surface and are molded or cast as one part. The invention disclosed herein is applicable to thrust washers in any of these applications.

Accordingly there is a need to produce an improved phenolic thrust washer with improved performance under high heat and pressure and reduced friction.

SUMMARY OF THE INVENTION

Plastic molded articles with improved heat resistance are comprised of two thermosetting molding materials. First, a state of the art phenolic molding compound that forms the structural part of the article, and second, a phenolic sheet molding compound that is co-molded with the phenolic molding compound to form a heat resistant skin.

Preferred embodiments of the invention include a phenolic piston used in disc brake systems and phenolic thrust washers used in automatic transmissions. Both are useful in the automotive and truck industry. The composite plastic articles are useful for other applications that are exposed to high temperatures in the automotive, appliance, electrical, electronic, and aerospace industries.

In one aspect, the invention comprises a composite vehicular brake piston for activating a disc brake to stop the vehicle. The piston comprises a cylindrical plastic body having an open end and a closed end. The plastic body is molded from a state of the art phenolic resin molding compound as currently used for disc brake pistons. The open end of the piston is co-molded with a high performance phenolic sheet molding compound preferably composed of phenolic resin, carbon fibers and optionally other additives. The phenolic-carbon fiber skin or outer surface is chemically bonded to the base piston material thereby imparting higher heat resistance to the composite piston.

In accordance with the invention, a thin layer of phenolic sheet molding compound is co-molded with a state of the art or "piston grade" phenolic molding compound, such that the phenolic surface cross links to form a composite material that is resistant to separation at the interface by thermal, chemical or mechanical stress.

In another aspect of the invention, the phenolic resin carbon composite is draped in a mold so the phenolic carbon composite takes the form of the open end wall, and also the outside surface and the inside surface of the piston wall, when the mold is closed. The position of the fiber reinforces the resulting phenolic resin-carbon composite article.

The invention further comprises a plastic thrust washer. The plastic body is molded from a state of the art phenolic resin molding compound as used for thrust washers. The plastic body is co-molded with a high performance phenolic sheet molding compound composed of phenolic resin, and carbon fibers and optionally other additives. The phenolic-carbon compound is molded with "state of the art" thrust washer grade phenolic molding compound, such that the phenolic surface cross-links to form one composite material that is resistant to separation at the interface by thermal, chemical or mechanical means.

With respect to the thrust washer, the phenolic resin-composite is draped in the mold so the phenolic carbon composite takes the form of a castled surface when the mold is closed. The position of the fiber reinforces the resulting phenolic resin-carbon composite thrust washer.

With this invention, the composite molded article is composed of two compatible phenolic thermosetting molding compounds that are simultaneously co-molded in one step. In the case of thrust washers, the resulting product has improved performance under heat and pressure as well as lower friction compared to the same part without the skin.

There occurs a chemical cross linking of the two phenolic materials into one molded product that resists mechanical, chemical, and thermal methods to separate the two materials.

The molded article is composed of a state of the art phenolic molding compound to form the major part of the plastic article and a high performance phenolic sheet molding compound forming the outer skin. This skin can have a thickness in the range of about 0.001 to about 0.05 inch, preferably about 0.005 to about 0.03 inch. This is in contrast to Yanagi pre-formed rings that appear to be 0.25 inch in thickness.

With the heat resistant skin of the molded article exposed to a heat source, the heat resistance of the molded article is improved over the same part made of the state of the art molded product in the following ways. Thermal shock or crack resistance is improved and resistance to oxidation or thermal degradation is improved along with strength at elevated temperatures. The amount of improvement is dependent on the type and quality of material used.

The following observations were made with respect to the invention.

1. The molded articles of two similar phenolic molding compounds are simultaneously co-molded in one step.
2. The phenolic sheet molding compound is shaped to the contour of the mold in the molding process
3. There is a chemical cross linking of the two materials that resists separation by mechanical, chemical or thermal means.
4. In the case of pistons of the invention, there is no need for a plurality of perforations as taught by Yanagi.
5. The phenolic molding compound skin containing carbon fiber may extend over multiple surfaces of the molded plastic article.

DETAILED DESCRIPTION OF THE DRAWINGS

Figure 1:
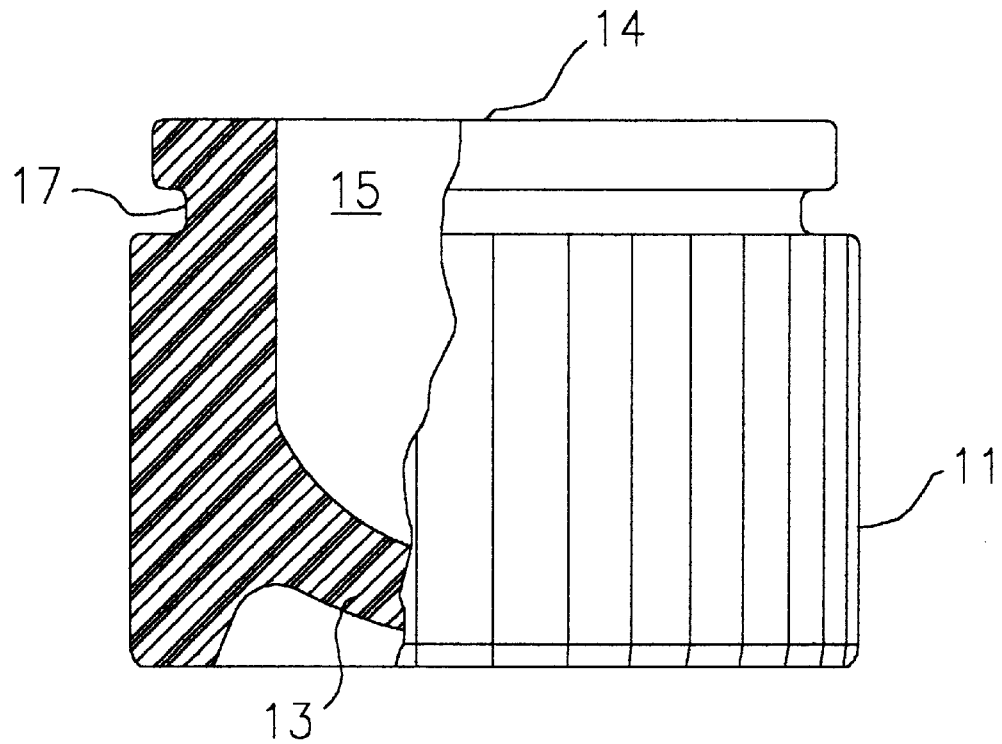
FIG. 1 is an elevation view, partially in section, of a conventional resinous disc brake piston as molded from a phenolic molding compound.

In FIG. 1 there is shown a state of the art plastic disc brake piston 11 molded from phenolic molding compound. The cylindrical piston 11 has a closed end 13 and an open end 15. The annular groove 17 is machined into the surface of the piston 11 used to attach a dust boot (not shown) to the piston 11 The piston 11 has end wall 14.

Figure 2:
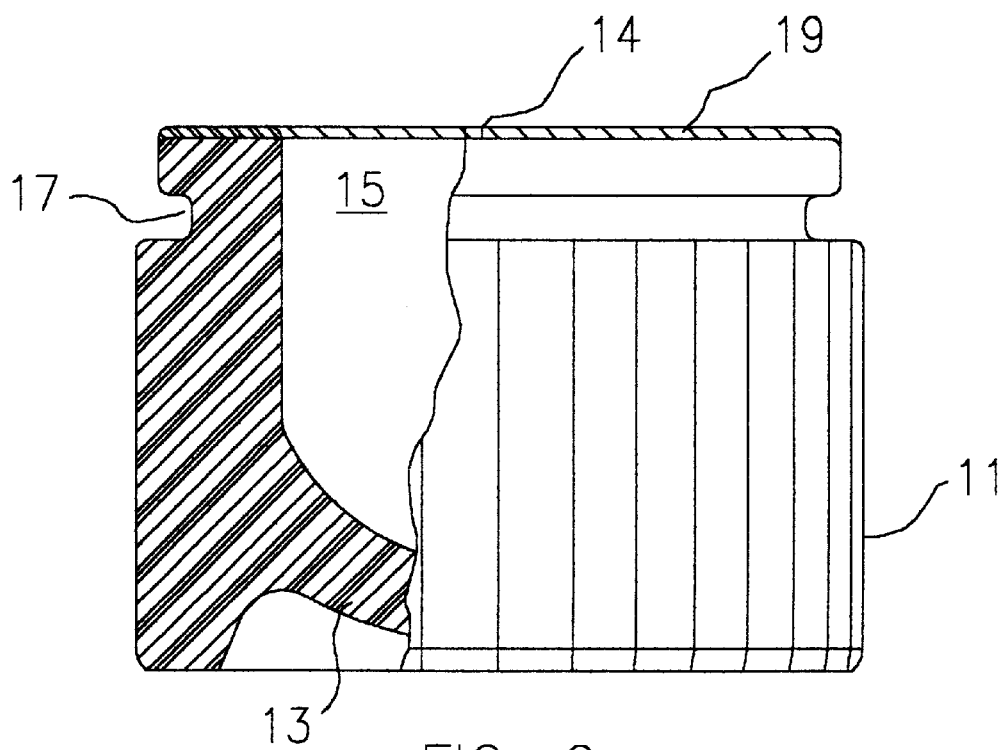
FIG. 2 is an elevation view of a composite piston of the invention, partially in section, which illustrates a skin of phenolic sheet molding compound covering the end wall of a plastic piston.

FIG. 2 illustrates an embodiment of the invention. A skin 19 of the invention extends over and covers the end wall 14 of open end 15 of piston 11 and becomes an inseparable and integral part of piston 11.

Figure 3:
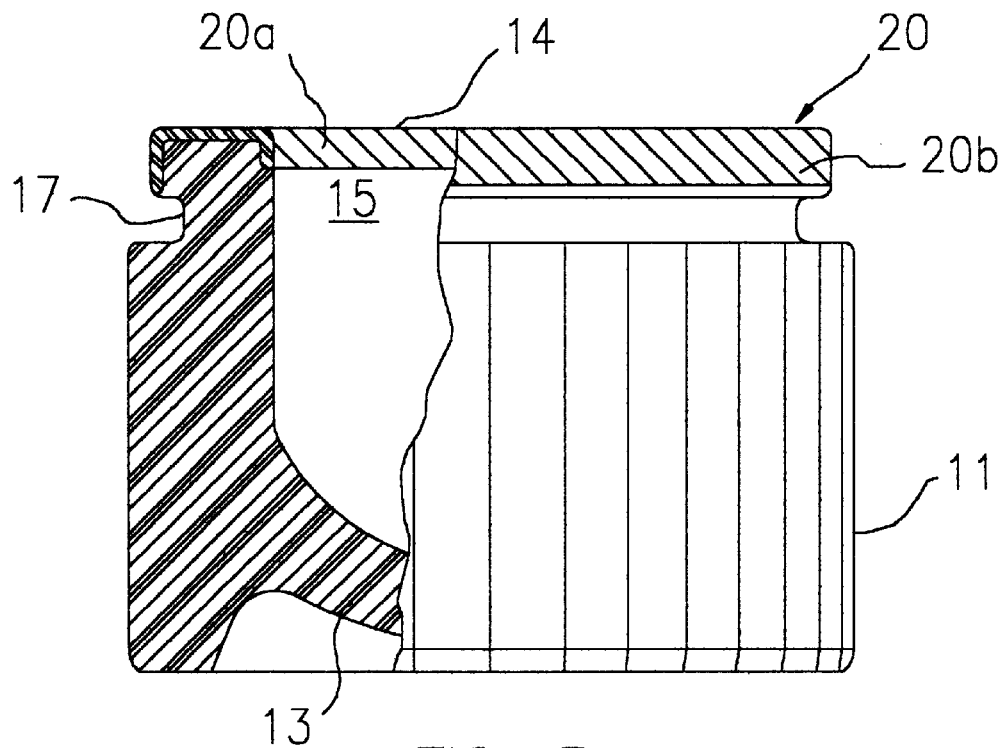
FIG. 3 is an elevation view of a composite piston of the invention, partially in section, which illustrates a skin of phenolic sheet molding compound covering the end wall of a plastic piston, as well as extending over the outside and inside surfaces of the piston.

In FIG. 3, the skin 20 of the invention is shown covering the end wall 14 of open end 15 of piston 11, and extending over the outside surface 20b of the piston 11 and the inside surface 20a of the piston 11. The phenolic sheet molding compound is cut larger than the end wall 14 of open end 15 of piston 11 and is formed to the contour of the mold as it softens from the heat of the mold, then densifies and cures under heat and pressure. The boot groove 17 is machined in the piston 11.

Figure 4:
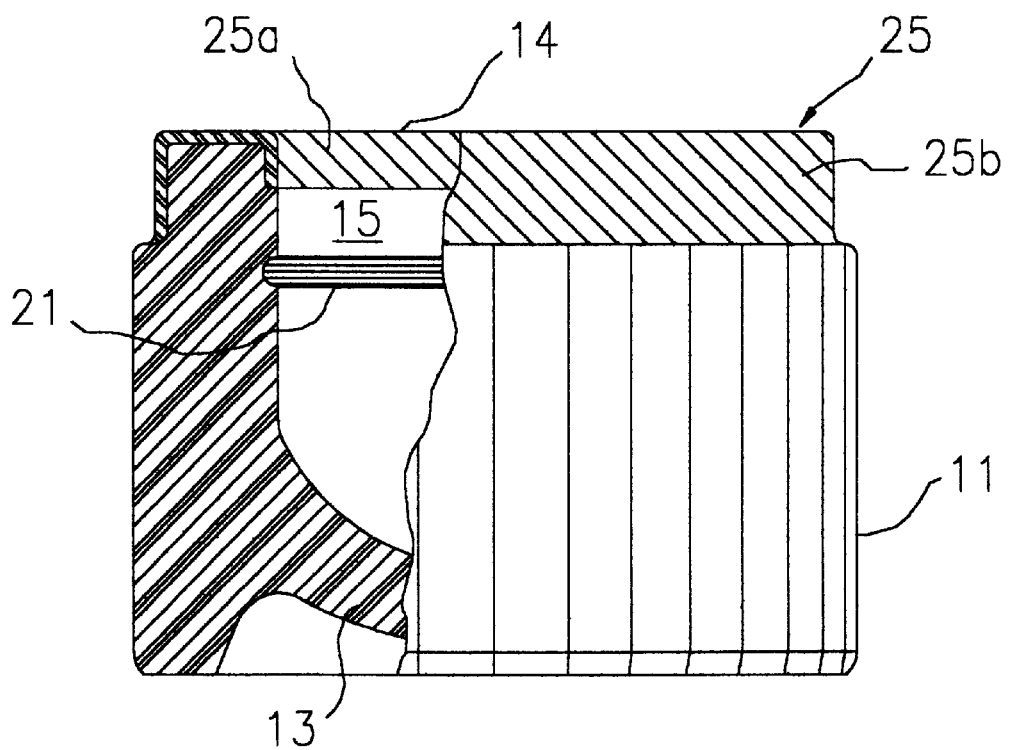
FIG. 4 is an elevation view of a composite piston of the invention, partially in section, which illustrates a skin of phenolic sheet molding compound covering the end wall of a plastic piston, and extending over the outside and inside surfaces of the piston.

FIG. 4 illustrates an embodiment of the invention wherein there is no boot groove, thereby permitting the skin 25 to be extended further down the outside surface 25b of the open end 15 of the piston 11. The skin 25 extends down the inside surface 25a of the open end 15 of piston 11. This type of piston, uses a pressed on boot that may include a locking ring (not shown.) An internal groove 21 is machined to secure the piston to the brake backing plate (not shown).

Figure 5B:
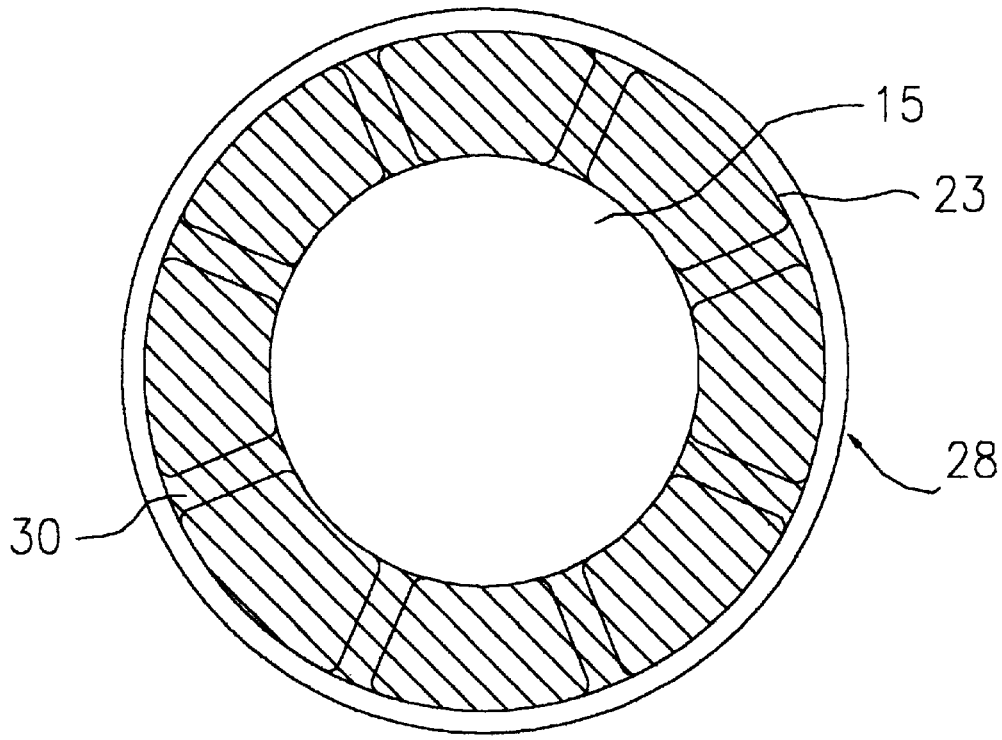
FIG. 5B is a top view of the invention illustrated in FIG. 5A.
Figure 5A:
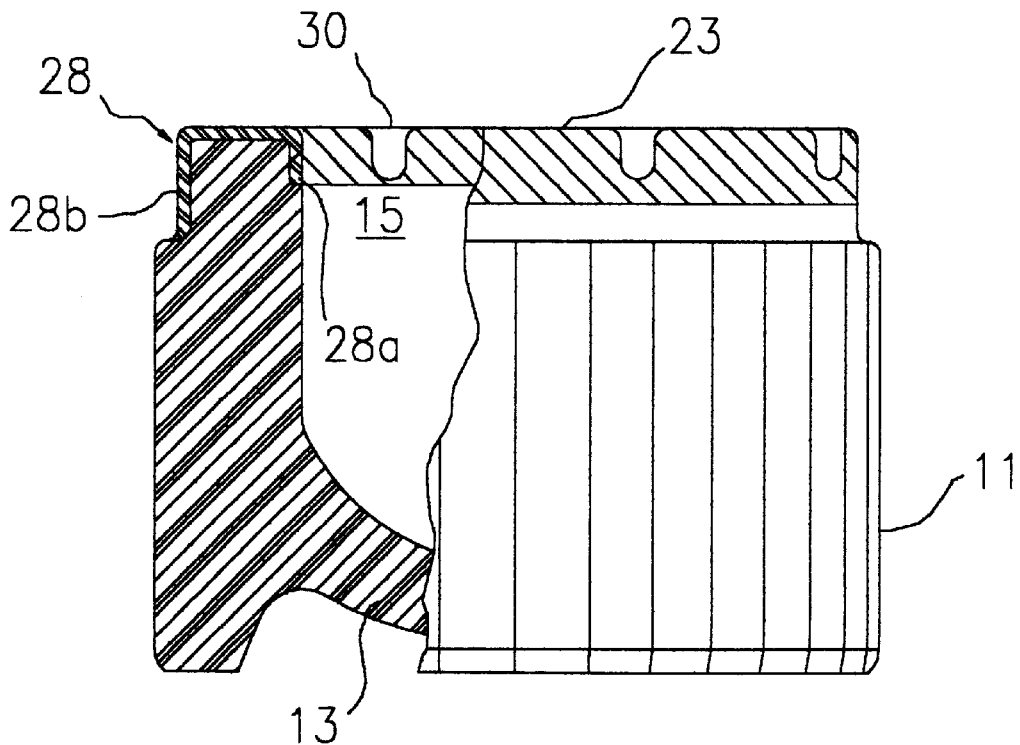
FIG. 5A is an elevation view of a composite piston of the invention, partially in section, which illustrates a skin of phenolic sheet molding compound covering the end wall of a piston, as well as extending over the outside and inside surfaces of the piston.

FIG. 5 A and FIG. 5B illustrate an embodiment of the invention wherein the open end 15 of the piston 11 is castled, thereby forming pressure pads 23 and vents 30. The phenolic sheet molding compound skin 28 conforms to the contour of the mold in the molding process. The skin extends over the inside surface 28a and outside surface 28b of the piston. The vent 30 permits air flow, helping to cool the caliper system (not shown) and brake fluid (not shown) of a disc brake assembly (not shown). The composite piston 11 provides improved long term heat or oxidation resistance.

Figure 6B:
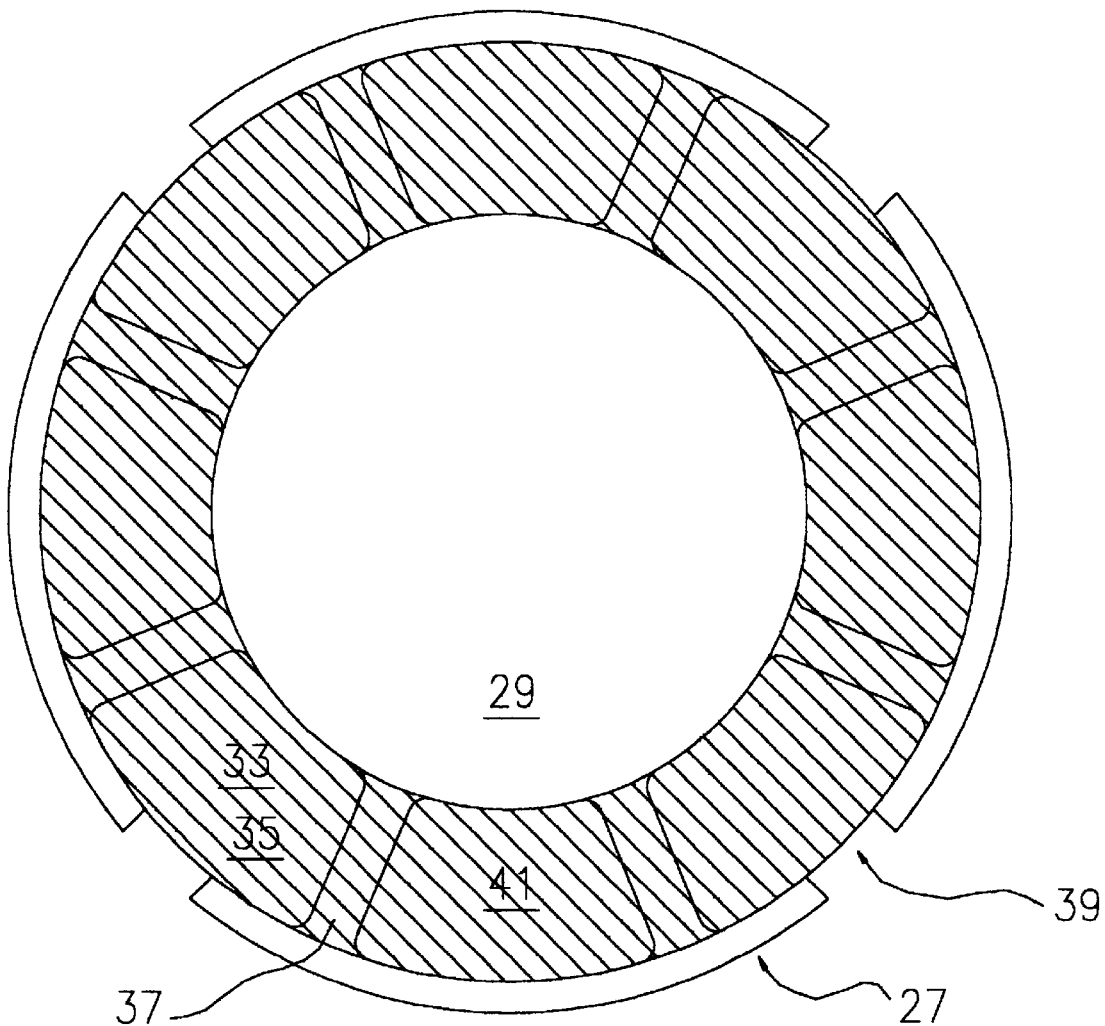
FIG. 6B is a top view of the thrust washer of FIG. 6A.
Figure 6A:
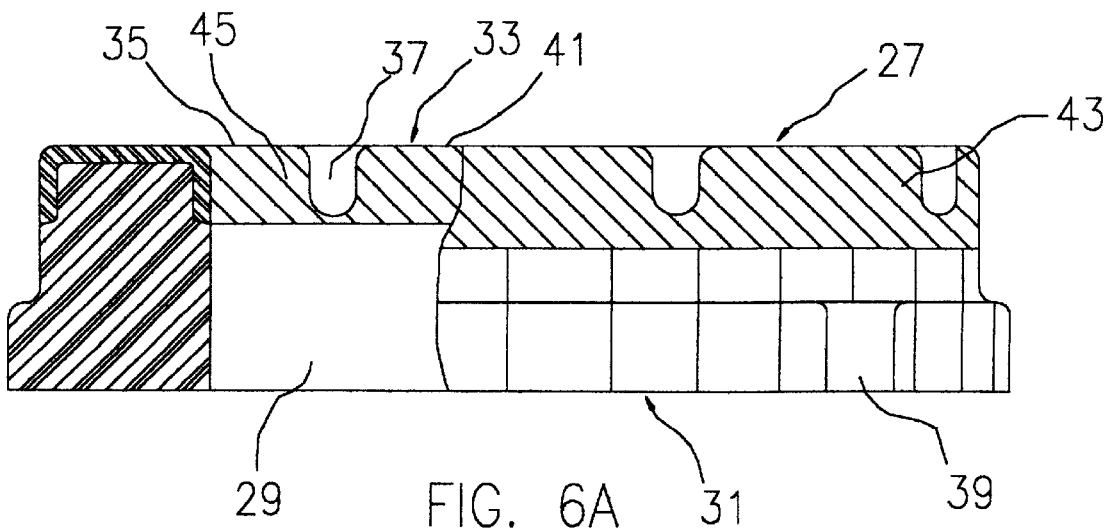
FIG. 6A is an elevation view of a composite thrust washer of the invention, which illustrates a skin of phenolic sheet molding compound covering the end wall of a thrust washer, as well as extending over the outside and inside surfaces of the piston.

FIG. 6A and FIG. 6B illustrate an embodiment of the invention wherein a thrust washer 27 as used in automotive automatic transmissions is a circular washer 27 with a central through hole 29. The washer 27 has a flat face wall 31 and a castled face wall 33 with pressure pads 35 and vents 37. On the exterior of the largest ring are locking grooves 39. The thrust washer body 27 is molded from state of the art phenolic molding compound. A phenolic sheet molding compound is used to form skin 41 over the castled face 33 covering the pressure pads 35 and the vents 37. The resin skin extends over the outside surface 43 and inside surface 45 of the thrust washer 27 to the depth of the vents 37.

Figure 7B:
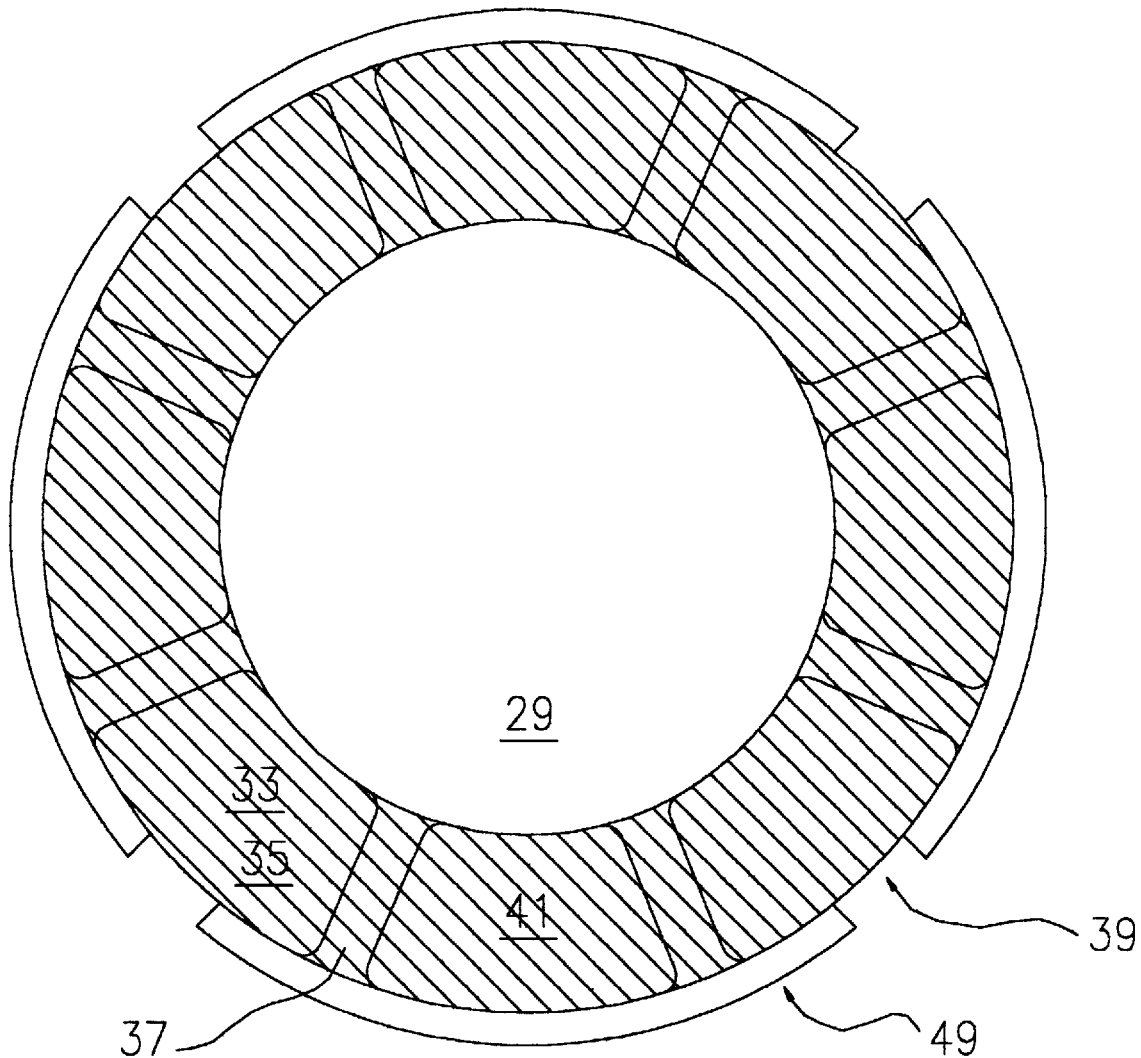
FIG. 7B is a top view of the thrust washer of FIG. 7A.
Figure 7A:
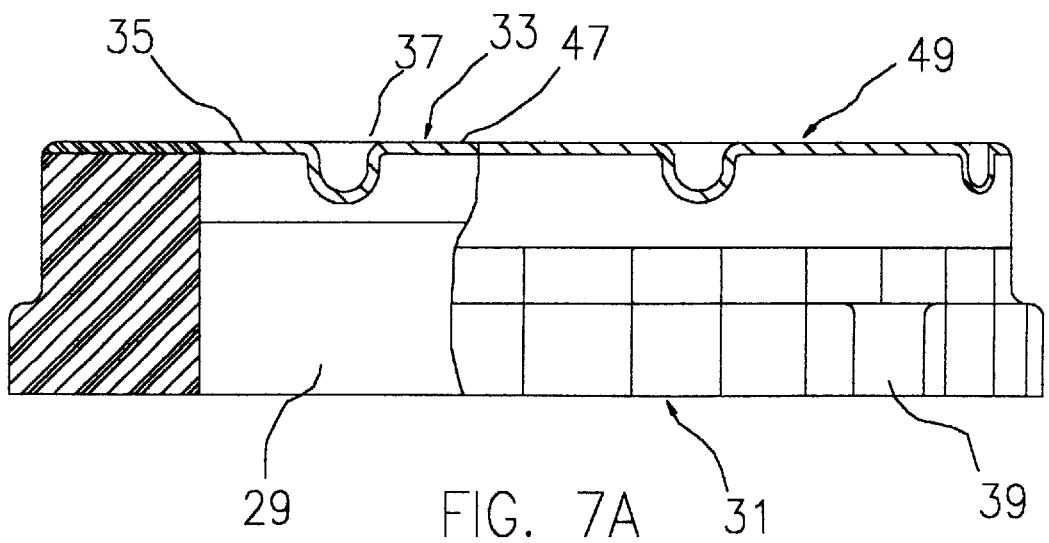
FIG. 7A is an elevation view of a composite thrust washer of the invention, partially in section, which illustrates a skin of phenolic sheet molding compound covering the end wall of a thrust washer.

FIG. 7A and 7B illustrate an embodiment of the invention wherein a thrust washer 49 is used in an automotive automatic transmission. In this embodiment, the washer 49 is coated with a sheet molding compound skin 47 that covers the castled face wall 33 of the thrust washer 49.

Figure 8:
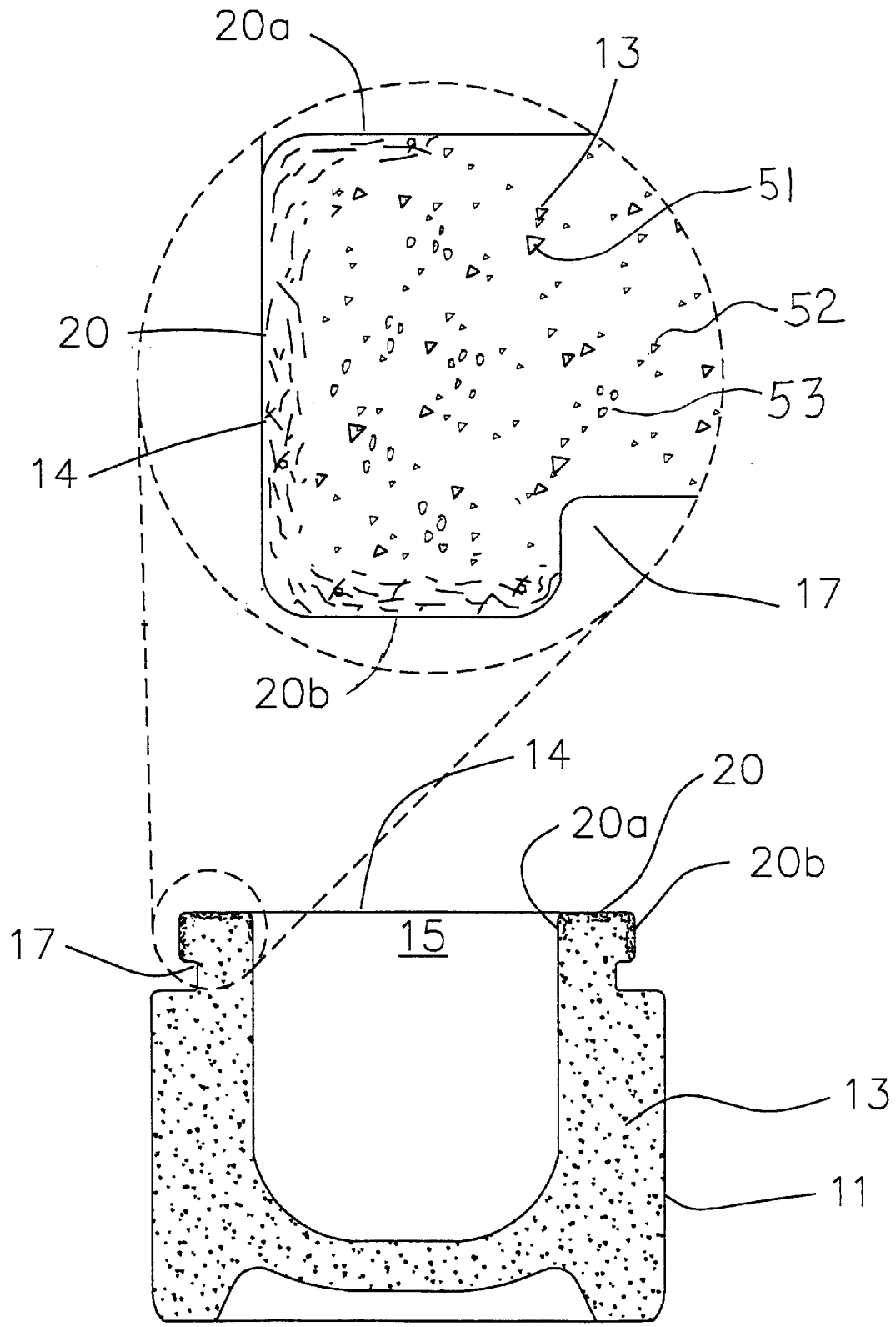
FIG. 8 is a sectional view of the piston shown in FIG. 3 but including an enlargement to show the co-molding in more detail.

FIG. 8 illustrates plastic disc brake piston 11 as shown in FIG. 3, but includes an enlarged view to illustrate the co-molding. In the embodiment shown, the co-molding includes glass fibers 51, mineral fillers 52, and carbon fibers 53. It should be appreciated that the invention as claimed does not require all of the fibers to be present in one embodiment. In a preferred embodiment of the invention, the phenolic resin skin contains filler materials which are dissimilar to filler materials contained in the phenolic resin of the body.

DETAILED DESCRIPTION OF THE INVENTION

Although the invention will be described in terms of disc brakes particularly for motor vehicles, it will be understood that the improved piston of the invention is also adaptable to piston activated brakes utilized on aircraft, railroad vehicles, and in any hydraulic activation systems. The invention will also be described in detail with respect to thrust washers for the torque converter of an automotive transmission.

In the description that follows, "co-molding" is defined as a molding process for combining two or more plastic materials to form one unified integrated part. The plastic materials can be similar or dissimilar. The process can comprise one or more steps.

The phrase "continuous resin reaction" defines a reaction that takes place when two or more thermosetting plastic materials with the same base resin are simultaneously co-molded and the same chemical reaction takes place throughout the plastic part. This is in contrast to co-molding of two thermoplastic materials, or two thermosetting plastic materials with dissimilar resin systems resulting in a plastic part with a bond between the two materials.

Phenolic disc brake pistons are molded from phenolic thermosetting resins by compression, transfer or injection molding methods. The phenolic molding material crosslinks (reacts chemically) under heat and pressure to form a disc brake piston. Phenolic pistons are typically compression molded from preforms, generally preheated to 200° F. to 260° F. The mold temperatures are generally in the range of 320° to 380° F. with mold pressures generally in the range of 2000 psi to 5000 psi. Cure time is generally 1½ minutes to 2 minutes. The pistons are generally post cured to further advance the chemical reaction, thereby improving the heat resistance and dimensional stability of the piston.

The invention involves a composite vehicular brake piston for activating a disc brake to stop a vehicle, comprising a cylindrical plastic body having an open end and a closed end. The plastic body is molded from a state of the art phenolic resin molding compound as used for disc brake pistons that are currently manufactured and used.

In accordance with this invention, the open end of the piston is co-molded with a high performance phenolic sheet molding compound preferably composed of phenolic resin, carbon fibers and optionally other additives. The phenolic-carbon fiber skin or outer surface is chemically bonded to the base piston material thereby imparting higher heat resistance to the composite piston.

The improved piston of this invention utilizes a heat resistant carbon fiber skin on the piston in the area of the piston that contacts the hot backing plate of the brake shoe. The carbon fiber skin extends over the outside surface of the piston for about ¼ inch but can also be extended from 1/16 inch up to about one inch. The carbon fiber can also extend into the open end of the piston about ¼ inch, or in the range of 1/16 inch up to about ½ inch.

In the case of thrust washers, the skin of the invention extends over the top of the thrust washer, and may extend down a surface of the thrust washer to the extent of about ½ inch.

In one aspect of the invention, a thin layer of phenolic sheet molding compound is molded with a piston grade phenolic molding compound such that the phenolic surface crosslinks to form one composite material that is resistant to separation at the interface of the resin body and the skin by thermal, chemical or mechanical means.

The improved plastic pistons of the invention are generally manufactured using a phenolic sheet molding compound cut into the desired shape that is larger in area than the open end wall and has a hole or opening that is smaller than the inside diameter of the open end of the piston mold. This sheet molding compound is placed in the desired location of the open mold and becomes shaped or formed to the contour of the mold during the subsequent molding steps. The phenolic molding compound that forms the plastic body is placed in the open mold or injected in the closed mold and the two phenolic materials cross link to form a composite plastic piston.

The phenolic sheet molding compound can be pre-shaped to the mold contour to help automate the molding process.

The improved pistons of the invention are generally manufactured by placing a phenolic resin carbon fiber filled sheet molding compound in a mold. Then the phenolic molding compound comprising resin, fillers and reinforcement are placed in the body of the mold and pressed to form a plastic piston where the carbon fiber filled product forms a skin on at least one surface of the piston. The two phenolic base materials are composite molded and cured under heat and pressure to form a composite piston. The two phenolic base materials are chemically bonded. The bond is such that it resists separation by mechanical, chemical or thermal means.

With this invention, the molded article is composed of two compatible thermosetting phenolic molding compounds that are co-molded in one composite product. There is a chemical cross linking of the two materials into one molded product that resists mechanical, chemical and thermal methods to separate the two materials.

The molded article is composed of a state of the art phenolic molding compound to form the major part of the plastic article and a high performance phenolic sheet molding compound forming the outer skin. This skin can have a thickness in the range of about 0.001 to about 0.05 inch, preferably about 0.005 to about 0.03 inch.

A phenolic sheet molding compound such as Enduron 4685, manufactured by Fiberite Company, had an uncured thickness of 0.050 inch and is cured in the molding process to a 0.015 inch skin on the composite piston.

A typical skin thickness is 0.015 inch thick and is formed from a high performance phenolic sheet molding compound reinforced with carbon fibers.

The improved pistons were compared to standard phenolic pistons and to standard phenolic pistons using a metal cap as a heat shield. These systems were evaluated on a heated plate with thermal cycles designed to simulate standard mountain brake tests and to simulate longer term exposure to severe truck brake service conditions With the heat resistant skin of the piston of the invention exposed to a heat source, the heat resistance of the article is improved over the same part made of the state of the art molded product in the following ways. Thermal shock or crack resistance is improved about 150 to 200 degrees Fahrenheit. The oxidation resistance or thermal degradation is improved about 100 degrees Fahrenheit. Piston strength is improved at elevated temperatures.

The high performance phenolic sheet molding compound is composed of a heat resistant phenolic resin together with carbon fiber. The carbon fiber preferably has a random orientation in a phenolic resin matrix.

The sheet molding compound (at room temperature) is added to the heated mold. Other process conditions are as disclosed hereinabove for conventional pistons made from phenolic molding compounds.

The sheet molding compound can be added to the mold in one layer or in multiple layers. The sheet molding compound generally is reduced in thickness three fold in the molding process.

The final thickness of the sheet molding compound is generally in the range of about 0.001 inch to about 0.05 inch. The starting thickness to achieve this thickness is generally in the range of about 0.0034 inch to about 0.17 inch.

The final thickness of the sheet molding compound is preferably in the range of about 0.005 inch to about 0.03 inch. The starting thickness to achieve this thickness is preferably in the range of about 0.017 inch to about 0.10 inch.

In the molding process for composite molded plastic articles, a phenolic sheet molding compound is placed in the desired location in an open mold. The compound is shaped or formed to the contour of the mold, in the subsequent molding steps. The phenolic molding compound that forms the plastic body is placed in the mold. The mold is closed and the two materials are co-molded and cross linked to form the composite plastic article with improved heat resistance. The two phenolic materials form a composite structure that resists separation by mechanical, chemical or thermal methods.

In the molding process for producing thrust washers of the invention, the sheet molding compound is placed in the desired location of the open mold. The molding compound softens from the mold heat then becomes shaped or formed to the contour of the mold during the subsequent molding steps. The composite thrust washer provides improved performance under the transmission operating conditions.

EXAMPLES

Commercial Materials

Durez 29502 and Durez 32875 are mineral and glass filled granular phenolic molding compounds that are "piston grade."

Durez 156 is mineral and cellulose filled phenol formaldehyde molding compound; but not "piston grade".

Fiberite 4029 F1 is a mineral and glass filled granular phenolic molding compound, that is "piston grade."

Enduron 4685 is a light weight PAN carbon fiber reinforced phenolic sheet molding compound.

Enduron 4695 is a 1.5 to 2 inch chopped glass reinforced phenolic sheet molding compound.

Enduron 4690 is an aramid fiber reinforced phenolic molding compound.

Piston Evaluation:

Disc brake pistons were molded at Modern Plastics Corporation, a custom molder of pistons, using procedures such as A, B, and C below.

A. Durez 29502 and Durez 32875 and Fiberite 4029 F1 were used as a control as shown in FIG. 1 with no skin or metal cap.

B. Durez 29502 and Durez 32875, and Fiberite 4029 F1 were used with a metal cap as taught by McCormick in U.S. Pat. No. 5,575,385.

C. Durez 29502 and Durez 32875 and Durez 156 and Fiberite 4029 F1 were used in combination with Enduron sheet molding compounds to make pistons as in Table I and Table II, which are embodiments of the invention.

Example I

A piston test for thermal shock resistance was developed to simulate the temperature cycle the piston would be exposed to on severe alpine car or light truck braking tests. A hot plate with a metal surface and a pyrometer was used to measure the surface temperature. A variac was used to control the temperature rise. A piston was placed on the hot plate with a weight on the piston. The temperature was increased from room temperature to 750° F. in 12 minutes then held at 750° F. for 2 minutes before increasing to 900° F. over the next 5 minutes. The temperature at which the sound of any crack or blister could be heard was recorded and is shown in Table I. The cooled pistons were checked for appearance on the open end and sectioned into four pie shaped cuts to check for internal cracks. The results are shown in Table I.

TABLE I

| TEST | 1 | 2 | 3 | 4 | 5 | 6 |
| --- | --- | --- | --- | --- | --- | --- |
| PISTON MATERIAL | 32875 | 32875 | 156 | 32875 | 4029F | 32875 |
| PISTON SURFACE | Enduron Carbon | None | Enduron Carbon | Enduron Carbon | Enduron Carbon | Metal Cap |
| PISTON | FIG. 3 | FIG. 1 | FIG. 3 | FIG. 3 | FIG. 3 | |

TABLE I-continued

| TEST | 1 | 2 | 3 | 4 | 5 | 6 |
|---|---|---|---|---|---|---|
| CONFIGURATION RESULTS | | | | | | |
| TEMPERATURE AT SOUND OF CRACKS ° F. | 900 | 725 | 720 | OK | OK | 850–900 |
| EXPOSED SURFACE | OK | Blisters Cracks | Blisters Cracks Carbon Fiber | OK | OK | Metal |
| CUT SURFACE | OK | Crack | Slight Crack | OK | OK | cracks |

*Enduron Carbon sold under the trade name of Fiberite 4685

Example II

The piston test from Example I was modified to simulate longer term or repeated exposure to high temperatures. Pistons were placed on a hot plate and the temperature increased from room temperature to 800° F. over one hour to prevent thermal shock cracking. The pistons were held at 800° F. for four hours. The pistons were sectioned and examined. The results are shown in Table II.

Example IV (Exposure to high temperatures)

Pistons were placed on a hot plate and the temperature increased from room temperature to 800° F. over one hour to prevent thermal shock cracking. The pistons were held at 800° F. for 8 hours. The pistons were sectioned and examined. The results of this test are shown in Table IV herebelow:

TABLE II

| TEST | 1 | 2 | 3 | 4 | 5 | 6 | 7 | 8 | 9 | 10 |
|---|---|---|---|---|---|---|---|---|---|---|
| PISTON MATERIAL | 32875 | 32875 | 32875 | 32875 | 156 | 4029F1 | 32875 | 29502 | 32875 | 32875 |
| PISTON SURFACES | Metal Cap | Enduron Carbon | None | Enduron Carbon | Enduron Carbon | Enduron Carbon | Enduron Carbon | Enduron Carbon | Metal Cap | None |
| CONFIGURATION | FIG. 3 | FIG. 3 | FIG. 1 | FIG. 3 | FIG. 3 | FIG. 3 | FIG. 3 | FIG. 2 | FIG. 3 | FIG. 1 |
| THICKNESS | | 0.015 | | 0.015 | 0.015 | 0.015 | 0.015 | 0.030 | 0.015 | |
| RESULTS | | | | | | | | | | |
| EXPOSED-SURFACE | Metal | OK | Few Cracks Slight Oxidation | OK | Rough | OK | Some Fiber Exposed | OK | Metal | Some Oxidation |
| CUT SURFACE | Cracks | OK | Crack | Slight Crack | Bad Crack | OK | OK | OK | Cracks | Cracks Blisters |

Example III

Pistons were tested for thermal shock by placing the pistons on a hot plate with a weight on the piston. The hot plate had been preheated to 750° F. for 2 minutes then increased to 850° F. for 3 minutes and held at 850° F. for 5 minutes. Total exposure was 10 minutes. The results of Example III are shown in Table III herebelow:

TABLE III

| | PHENOLIC PISTON | PHENOLIC PISTON WITH METAL CAP | COMPOSITE PHENOLIC PISTON |
|---|---|---|---|
| PISTON SURFACE | Cracks and Blisters | Metal | OK |
| CUT SURFACES | Cracks and Blisters | Cracks | OK |

TABLE IV

| TEST | 1 | 2 | 3 | 4 | 5 |
| --- | --- | --- | --- | --- | --- |
| PISTON MATERIAL | 32875 | 32875 | 32875 | 32875 | 32875 |
| PISTON SURFACES | Metal Cap | None | Enduron Carbon | Enduron Carbon | Enduron Carbon |
| PISTON CONFIGURATION | | FIG. 1 | FIG. 2 | FIG. 2 | FIG. 2 |
| THICKNESS LAYERS SMC | | | 0.015 | 0.03 | 0.045 |
| RESULTS | | | | | |
| EXPOSED SURFACE | Loose Cap | Cracks Oxidation | Slight Oxidation and Exposed Fibers | Slight Oxidation and Exposed Fibers | Slight Oxidation and Exposed Fibers |
| CUT SURFACE | Loose Cap Cracks Slight Oxidation | Cracks Oxidation | Slight Oxidation | Delamination of SMC and Slight Oxidation | Delamination of SMC and Slight Oxidation |

The two examples, III and IV above, show the bond between the SMC and the phenolic compound is stronger than either compound alone. The two phenolic materials mix as shown in FIG. 8 and there is a continuous resin reaction through the composite piston.

Composite pistons molded from phenolic resin "piston grade" molding materials, Durez 32875, Durez 29502, or Fiberite 4029 F1 for the piston body were co-molded with Fiberite sheet molding compound, Enduron 4685, a carbon fiber (PAN) reinforced phenolic sheet molding compound for the skin at the open end of the piston. The resulting pistons showed improved heat resistance over pistons molded from only the phenolic resin "piston grade" molding material.

The improved composite piston of the invention had heat resistance at least equal to pistons molded with a metal cap. The improved composite pistons of the invention showed substantially no heat cracks, and showed no separation or delamination of the carbon fiber reinforced skin. By contrast, the phenolic piston with the metal cap showed sub-surface cracks, and the phenolic material shrunk away from the metal cap on extended exposure to high temperatures.

The heat resistance of the improved composite piston was better when the carbon fiber material covered the open end of the piston and extended over the outside surface and inside surface of the piston as shown in FIG. 3 as compared to the piston shown in FIG. 2.

The improved composite piston of the invention was made with Enduron 4685 carbon fiber (PAN) reinforced phenolic sheet molding compound for the skin at the open end of the piston. The resulting pistons showed improved heat resistance compared to pistons molded from only the phenolic resin piston molding material.

In additional testing, the improved composite piston made with Enduron 4685 carbon fiber reinforced phenolic sheet molding compound showed improved heat resistance compared to Enduron 4695, a phenolic sheet molding compound reinforced with 1.5 to 2.0 chopped glass fibers. The Enduron 4695 provided improved heat resistance over the control piston made only from the base phenolic piston material.

The poor results in Test 3 of Table I and Test 5 of Table II resulted from the use of a phenolic molding compound Durez 156, that was not "piston grade."

Example V

Pistons were tested for thermal shock by placing the pistons on a hot plate with a weight on the piston. The hot plate had been preheated to 750° F. for 2 minutes and then increased to 850° F. for 3 minutes and held at 850° F. for 3 minutes and held at 850° F. for 5 minutes exposure was 10 minutes.

TABLE V

| | PHENOLIC PISTON | PHENOLIC PISTON WITH METAL CAP | COMPOSITE PHENOLIC PISTON |
| --- | --- | --- | --- |
| PISTON SURFACE | Cracks and Blisters | Metal | OK |
| CUT SURFACES | Cracks and Blisters | Cracks | OK |

What I claim is:

1. In a composite molded plastic disc brake piston having a cylindrical phenolic resin body and having an open end and a closed end, the improvement comprising a phenolic sheet molding compound skin that is simultaneously co-molded to the open end of the piston to provide a disc brake piston with improved heat resistance wherein the co-molded phenolic resin skin and the phenolic resin of the phenolic resin body are cross linked and chemically react with one another during molding in a continuous resin reaction across an interface between the skin and the body to form an integrated unified molded product which resists separation of the skin and resin body by mechanical, chemical or thermal methods.

2. The piston of claim 1 wherein the thickness of the skin is in the range of about 0.001 inch to about 0.05 inch.

3. The piston of claim 1 wherein the thickness of the skin is in the range of about 0.005 to about 0.03 inch.

4. The piston of claim 1 which has improved heat resistance over a piston made with the same phenolic resin compound but without a skin.

5. The piston of claim 1 which is improved in thermal shock resistance.

6. The piston of claim 1 which is improved in oxidation resistance or thermal degradation resistance.

7. The piston of claim 1 wherein the phenolic resin skin further comprises carbon fibers.

8. The piston of claim 1 wherein the phenolic resin skin is made of material selected from the group consisting of glass fibers, mineral fibers, and organic fibers.

9. The piston of claim 1 wherein the phenolic resin skin comprises materials selected from the group consisting of minerals, colors, lubricants and other additives and mixtures thereof.

10. The piston of claim 1 wherein a carbon fiber skin extends over the outside surface of the end of the piston.

11. The piston of claim 1 wherein a carbon fiber skin extends over the outside surface and the inside surface of the open end of the piston.

12. The piston of claim 1 wherein the open end has a castle shape to dissipate heat.

13. The piston of claim 1 wherein the phenolic resin skin contains filler materials which are dissimilar to filler materials contained in the phenolic resin of the body.

14. In a molded plastic disc brake piston having a cylindrical phenolic resin body and having an open end and a closed end, the improvement comprising a phenolic sheet molding compound skin that is simultaneously co-molded to the open end of the piston to provide a disc brake piston with improved heat resistance, wherein the co-molded phenolic resin skin and the phenolic resin of the phenolic resin body are cross linked and chemically react with one another during molding in a continuous resin reaction across an interface between the skin and the body to form an integrated unified molded product which resists separation of the skin and resin body by mechanical, chemical or thermal methods, and wherein the phenolic resin skin comprises carbon fibers, and wherein the carbon fiber skin extends over the outside surface and the inside surface of the open end of the piston up to one inch.

15. The piston of claim 14 wherein the thickness of the skin is in the range of about 0.001 inch to about 0.05 inch.

16. The piston of claim 14 wherein the thickness of the skin is in the range of about 0.005 to about 0.03 inch.

\* \* \* \* \*